United States Patent [19]

Fahrion

[11] Patent Number: 5,423,396
[45] Date of Patent: Jun. 13, 1995

[54] WORK DOCK

[76] Inventor: Otmar Fahrion, Dürerstr. 9, 70806 Kornwestheim, Germany

[21] Appl. No.: 84,278
[22] PCT Filed: Dec. 22, 1991
[86] PCT No.: PCT/EP91/02492
  § 371 Date: Jul. 8, 1993
  § 102(e) Date: Jul. 8, 1993
[87] PCT Pub. No.: WO92/12090
  PCT Pub. Date: Jul. 23, 1992

[30] Foreign Application Priority Data

Jan. 11, 1991 [DE] Germany ............ 41 00 648.8

[51] Int. Cl.$^6$ .................................. B66F 11/04
[52] U.S. Cl. ............................ 182/36; 182/115
[58] Field of Search .......... 182/36, 130, 141, 136, 182/117, 115, 179

[56] References Cited

U.S. PATENT DOCUMENTS 2,978,062 4/1961 Camillo ..................... 182/115
3,256,955 6/1966 Izmirian .
4,668,301 5/1987 Takigawa .

FOREIGN PATENT DOCUMENTS 1359134 3/1964 France .
2142649 2/1973 France .
3720239 1/1989 Germany .
1032434 6/1966 United Kingdom ......... 182/115

*Primary Examiner*—Alvin C. Chin-Shue
*Attorney, Agent, or Firm*—Lowe, Price, LeBlanc & Becker

[57] ABSTRACT

A dock for carrying out work on an aircraft has a plurality of support frameworks disposed on either side of the aircraft fuselage. The dock also includes a plurality of support work platforms supported to the frameworks. The support frameworks are movable sideways to allow the aircraft to be docked and undocked therebetween. The frameworks include longitudinal beams which are disposable so that a wing of the aircraft may extend freely between other adjacently placed port framework elements. Support frameworks have horizontal guide means for guiding vertical guide frames along which movable support slides may be disposed and each carry a work platform. In this manner, workers have free access to the exterior skin portion of the aircraft with great facility.

18 Claims, 8 Drawing Sheets

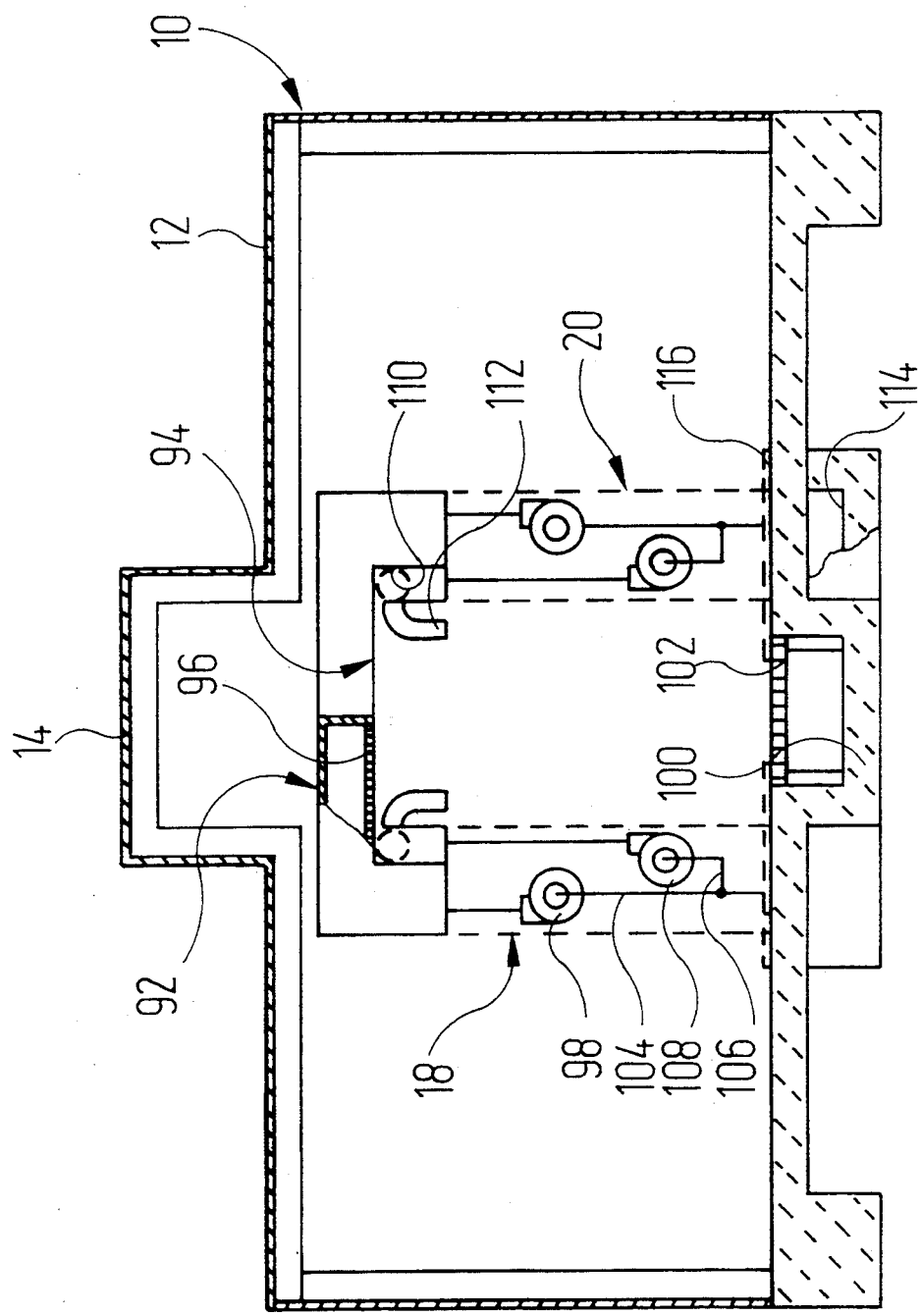

WORK DOCK

FIELD OF THE INVENTION

The invention relates to a dock for carrying out work on an aircraft, and more particularly to a work dock which allows rapid docking and undocking of the aircraft and affords a large number of mechanics simultaneous, safe and vibration-free access to the outer skin of the aircraft.

BACKGROUND OF THE RELATED ART

A known work dock is described in DE-A-3 720 239. It is used to carry out work on the horizontal tail unit and the rudder unit of an aircraft. It comprises a single framework, which is laterally displaceable on rails and has two vertically adjustable work platforms lying one above the other and extending over the entire length of the framework. For docking and undocking the aircraft, said frameworks are displaced in a lateral direction far enough to allow the rudder units to be moved through between them.

For minor maintenance and repair jobs to the outer skin of aircraft, adjustable mobile work cages are also used, by means of which a mechanic may be brought to the desired point of the outer skin. Such mobile work cages are very versatile but they are less suitable for work carried out on the entire aircraft, such as major overhauls, involving a great many—typically 80 to 100—mechanics. If mobile work cages are used for such work, only a total of at most 10 work cages may operate on the aircraft, each carrying 1 or 2 mechanics and additionally requiring a driver for reliable avoidance of collisions. A further drawback of such mobile work cages is that the work cage, which is carried by a long jib, is not adjustable without backlash or jolting, this being a drawback when it comes to carrying out surface work cleanly (e.g. painting).

For this reason, fixed scaffolds are often used for major overhauls of aircraft. The entire aircraft is scaffolded like a building and on the work platforms supported by the scaffolding the various workers may move independently of one another to desired points of the outer skin. However, it takes on the whole about 80 to 90 hours to erect and remove the scaffolding around an aircraft and during this period the maintenance crew are totally or largely idle.

It has also already been proposed to maintain the outer skin of aircraft from work cages suspended via vertically adjustable telescopes from crabs travelling along rails which are provided on the roof of the building. However, a typical work cage unit of this type weighs around 15 tonnes and, even if only the same total number of work cages achievable with mobile work cages were to be provided, the roof structure would be loaded with an additional weight of 150 tonnes. Since the crabs still have to be able to move beyond the highest point of the aircraft (vertical rudder) and the crab and the rails for the crab take up some room, a hangar accommodating such a dock additionally has to be built very high throughout its area. It is therefore not only the high loading capacity requirements of the roof structure which make such a hangar expensive, but also the building volume, with the large volume also increasing routine maintenance costs.

SUMMARY OF THE INVENTION

The object of the present invention is to provide a dock for carrying out work on the outer skin of an aircraft, which allows rapid docking and undocking of the aircraft and affords a large number of mechanics simultaneous, safe and vibration-free access to the outer skin of the aircraft.

Said object is achieved according to the invention by a work dock according to claim 1.

The work dock according to the invention is similar in its basic structure to a classic scaffold but does not have to be dismantled for docking and undocking since a front or rear section of the support frameworks positioned on either side of the aircraft is movable sideways to allow the wing tips to run past it for docking and undocking.

If a work dock according to the invention is provided at predetermined levels with, in each case, a plurality of adjacent, independently horizontally displaceable boards, it is then possible to arrange a key-connecting work floor around the aircraft. With the work dock according to the invention, undocking may then be effected without displacing the boards (in practice, several hundred) because the boards are moved away sideways together with the corresponding dock part. If the next aircraft to be docked is of the same type, then pushing together of the halves of the work dock immediately recreates the work floor which extends as far as the outer skin and fits its contours. If an aircraft of a different type is docked, all that is necessary is for the contour differences to be compensated by adjusting individual boards when the dock halves are moved together. Even with said type of dock, the splitting of the dock according to the invention results in substantial time benefits when the aircraft is docked and undocked.

Advantageous features and aspects of the invention are recited in the various claims.

The effect achieved by the development of the invention according to claim 2 is that the middle framework section may simultaneously travel over the wing and, with overhanging provision of a work platform, large areas of the underside of the wing are at the same time also easily accessible.

In the case of a work dock according to claim 3, said travel over the wing may be effected while maintaining operations in the front dock region.

The development of the invention according to claim 4 is advantageous in view of use of the work dock in connection with aircraft of differing fuselage length.

The effect achieved by the development of the invention according to claim 5 is that easy access may also be obtained to recessed and underlying sections of the outer skin.

The adjustable work platforms provided in a work dock according to claim 5 may simultaneously be used as elevators, by means of which equipment may be transported directly between the fuselage doors of the aircraft and the hangar floor. Thus, the usually 2×4 m work platforms may be used for rapid removal of the seats of an aircraft in the event of a retrofit or general overhaul. Trim panels and other parts of the aircraft interior to be exchanged may also be easily transported in this manner between aircraft and hangar floor.

With a work dock according to claim 6, easy access may be obtained to various outer skin points at the tail in the case of aircraft types of widely differing tail geometry.

The development of the invention according to claim 7 is advantageous in view of the simultaneous carrying out of work on the wing and on the middle fuselage section.

In the case of a work dock according to claim 8 or 9, the inner-lying and outer-lying work platforms of the middle framework sections may be moved independently of one another.

Mounting the work platforms on the support slides of the support frameworks via a strut arrangement according to claim 10 is advantageous in terms of a high degree of freedom from play, high loading capacity, wide-ranging alteration in length and low cost.

A work dock according to claim 11 provides a further improvement in guidance and loading capacity plus the possibility, by adjusting the two scissor-type linkages to a differing extent, of rotating the work platforms about the vertical axis. In particular, it is possible by said means to position the work platforms, for work on the radome and the root of the wing, parallel to the very region of the outer skin which is to be worked on.

With a work dock according to claim 12, the work platforms may be moved directly up against the support frameworks.

Mounting the work platforms on the scissor-type linkages according to claim 13 allows the work platforms to be lowered as far as the floor of the hangar which is fitted with the work dock.

In the case of a work dock according to claim 14, it is possible by interlocking two adjacent work platforms to produce an enlarged work platform.

The development of the invention according to claim 15 is advantageous in view of inexpensive manufacture of the vertical guide frame. The fork guides for fork lift trucks are manufactured in large piece numbers and are notable for their mechanical strength which is also perfectly adequate for the purposes of the present invention.

The effect achieved by the development of the invention according to claim 16 is the availability of corresponding work platforms for all of the jobs around the aircraft, thereby simplifying the stockkeeping of spare parts for the work platforms and guaranteeing identical attendance of all work platforms. Since said mobile work platforms are also horizontally mobile, they are eminently suitable for work on the underside of wings and, in the case of non-standard types of aircraft, areas of the fuselage which project over the dock.

According to claim 17, an air curtain is obtained, which flows around the fuselage and carries away paint mist and dirt, with the distributor channels, which deliver said curtain, for docking and undocking freeing a lane for the rudder unit.

In the case of the dock according to claim 18, the work area of the dock—possibly with the air curtain maintained there—is closed off from the rest of the maintenance hangar and hence from other work docks by a well-defined air curtain (air wall).

The development of the invention according to claim 19 is advantageous in view of the avoidance of connection points to the building-fixed installation.

Embodiments of the invention are described below in greater detail with reference to the drawings.

BRIEF DESCRIPTION OF THE DRAWING

FIG. 8: a transverse section through an aircraft maintenance hangar, having a split work dock which is only diagrammatically illustrated in order to show more clearly details of the air ducting system.

DETAILED DESCRIPTION OF THE PREFERRED EMBODIMENTS

Figure 1:
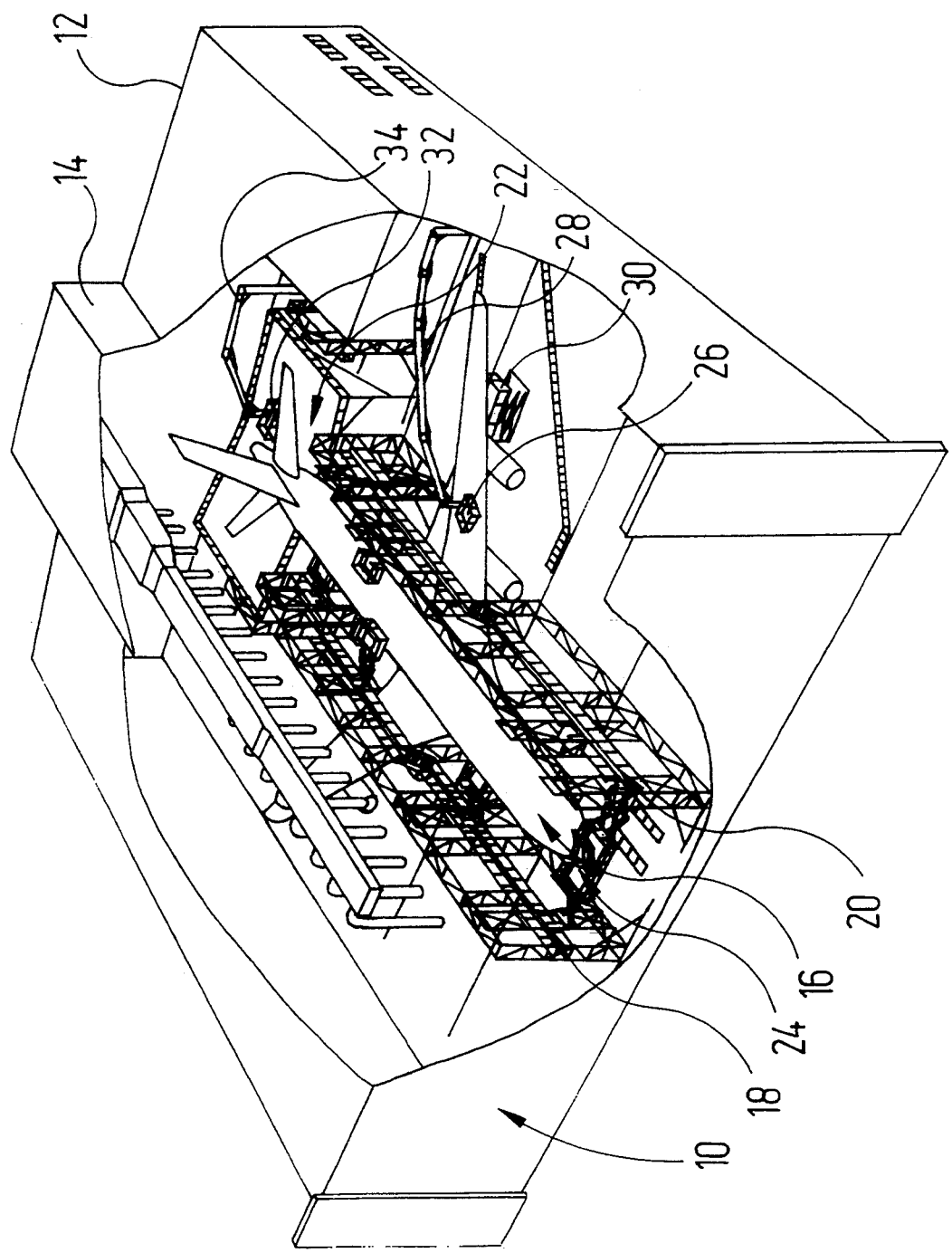
FIG. 1: a perspective, partially broken-away view of an aircraft maintenance hangar having a split work dock permitting rapid docking and undocking of an aircraft.

In FIG. 1, an aircraft maintenance hangar as a whole is designated 10. Its roof 12 has a raised middle roof section 14.

Figure 3:
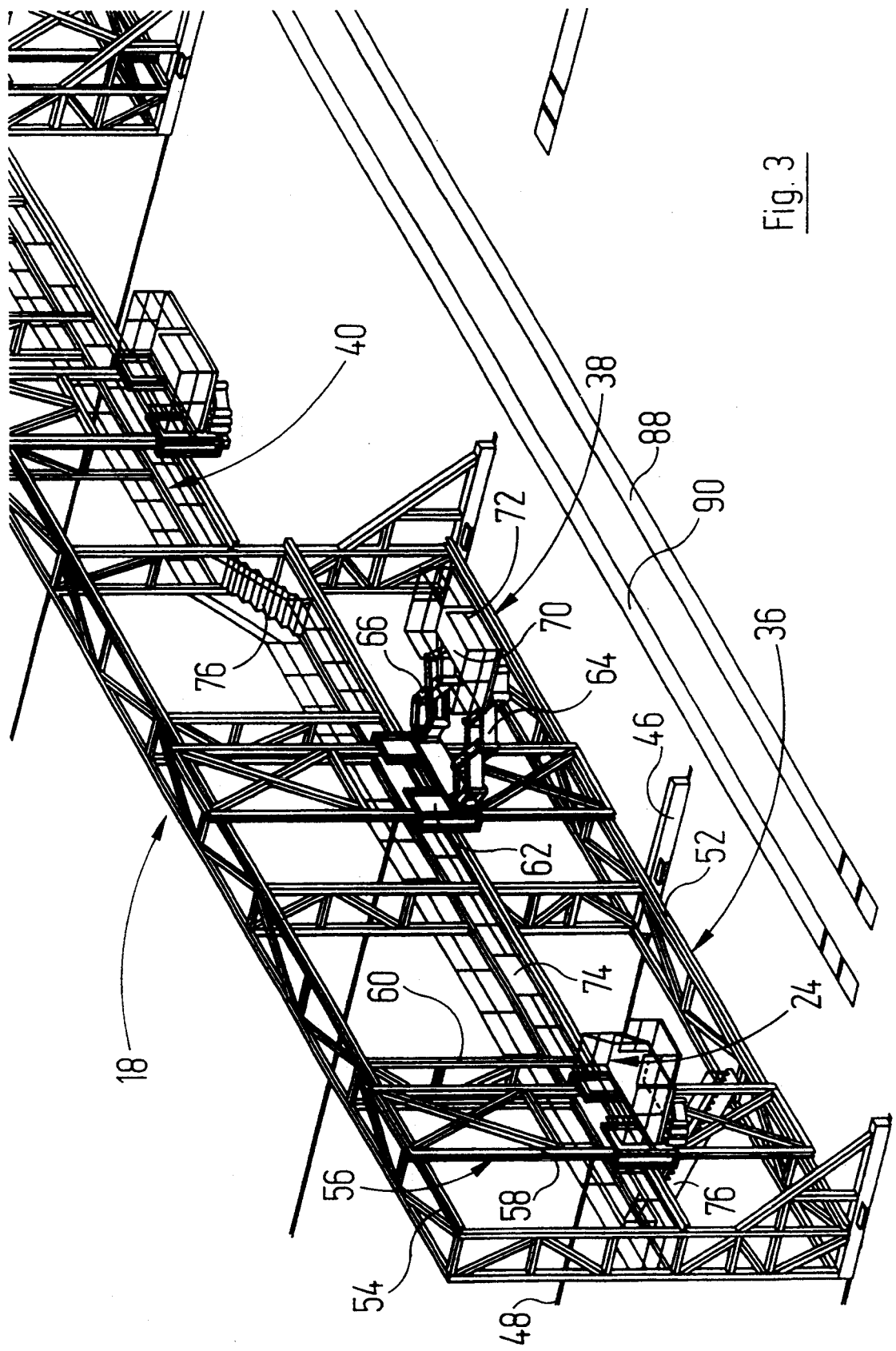
FIG. 3: an enlarged perspective view of the front section of the lefthand dock part.
Figure 4:
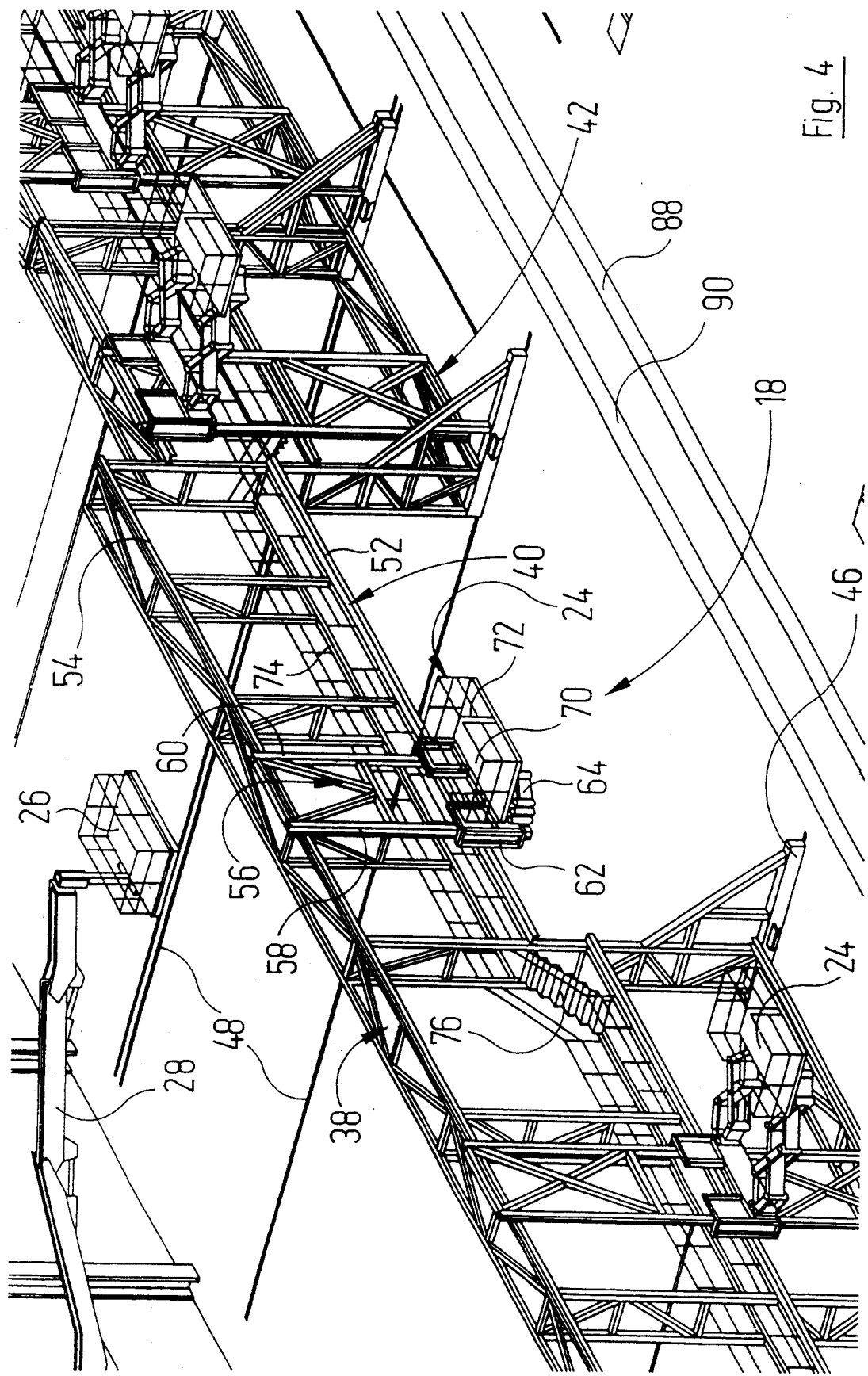
FIG. 4: an enlarged perspective view of the middle section of the lefthand dock part.
Figure 5:
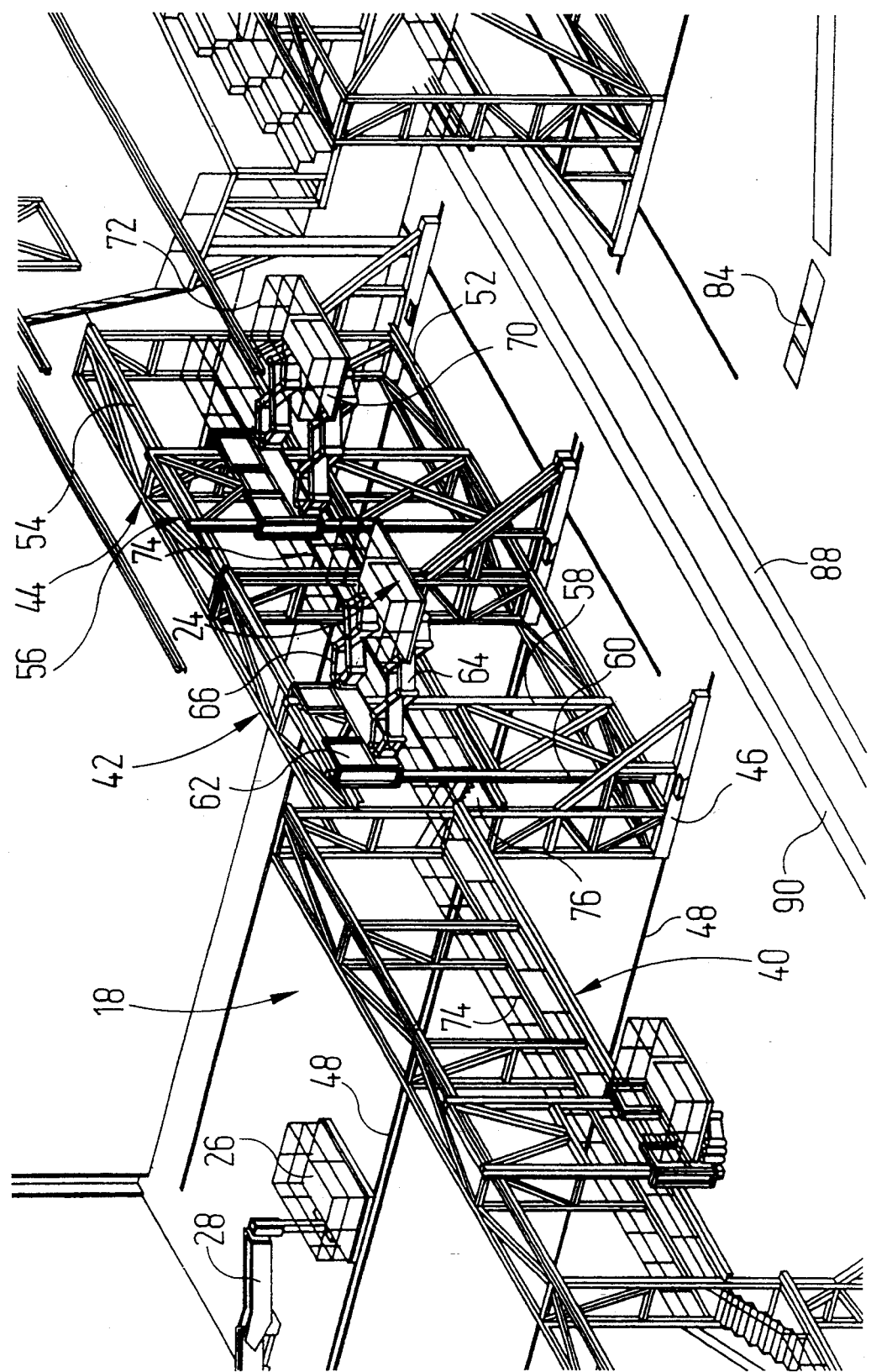
FIG. 5: an enlarged perspective view of the rear section of the lefthand dock part.
Figure 6:
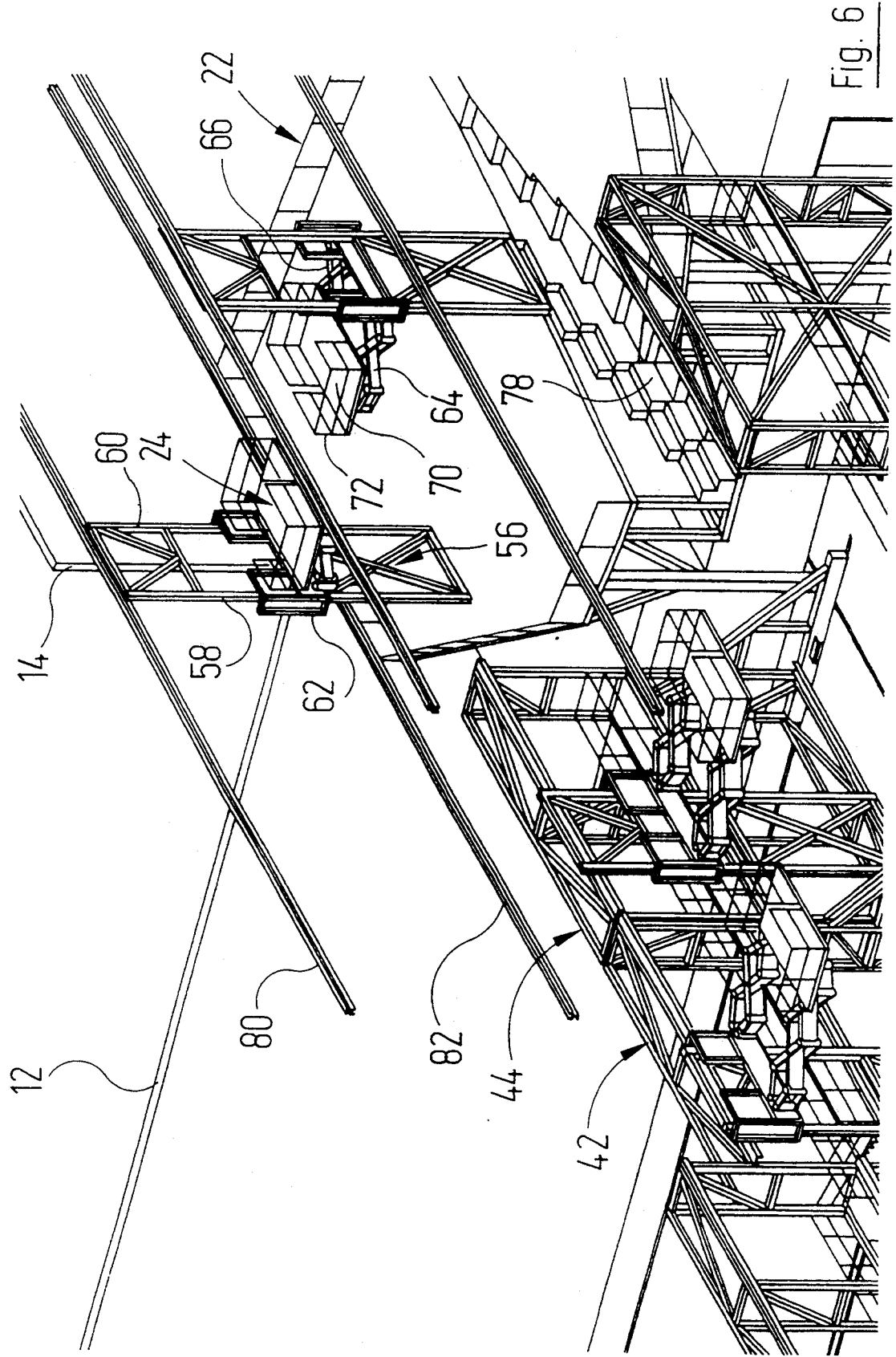
FIG. 6: an enlarged perspective view of the rear dock part.

An aircraft 16 is shown in the hangar. The various points of the outer skin of its fuselage are accessible via two lateral dock parts, as a whole designated 18 and 20, and a rear dock part 22. The dock parts 18, 20, 22 carry a plurality of work platforms 24 which are movable—relative to the fuselage—in a longitudinal and transverse direction as well as in a vertical direction. The edge contour of the foremost work platform 24 is adapted to the nose contour, as is clearly evident from FIGS. 1 and 3. For carrying out work on the top of the wings, further work platforms 26 are carried by long adjustable jibs 28, whose bases are fixed to the floor of the maintenance hangar 10. Vertically adjustable, mobile work platforms 30 are provided for carrying out work on the underside of the wings.

In the region of the rear dock part 22, further work platforms 32 are carried by jibs 34, whose bases are likewise fixed to the hangar floor or the dock part 22.

Figure 2:
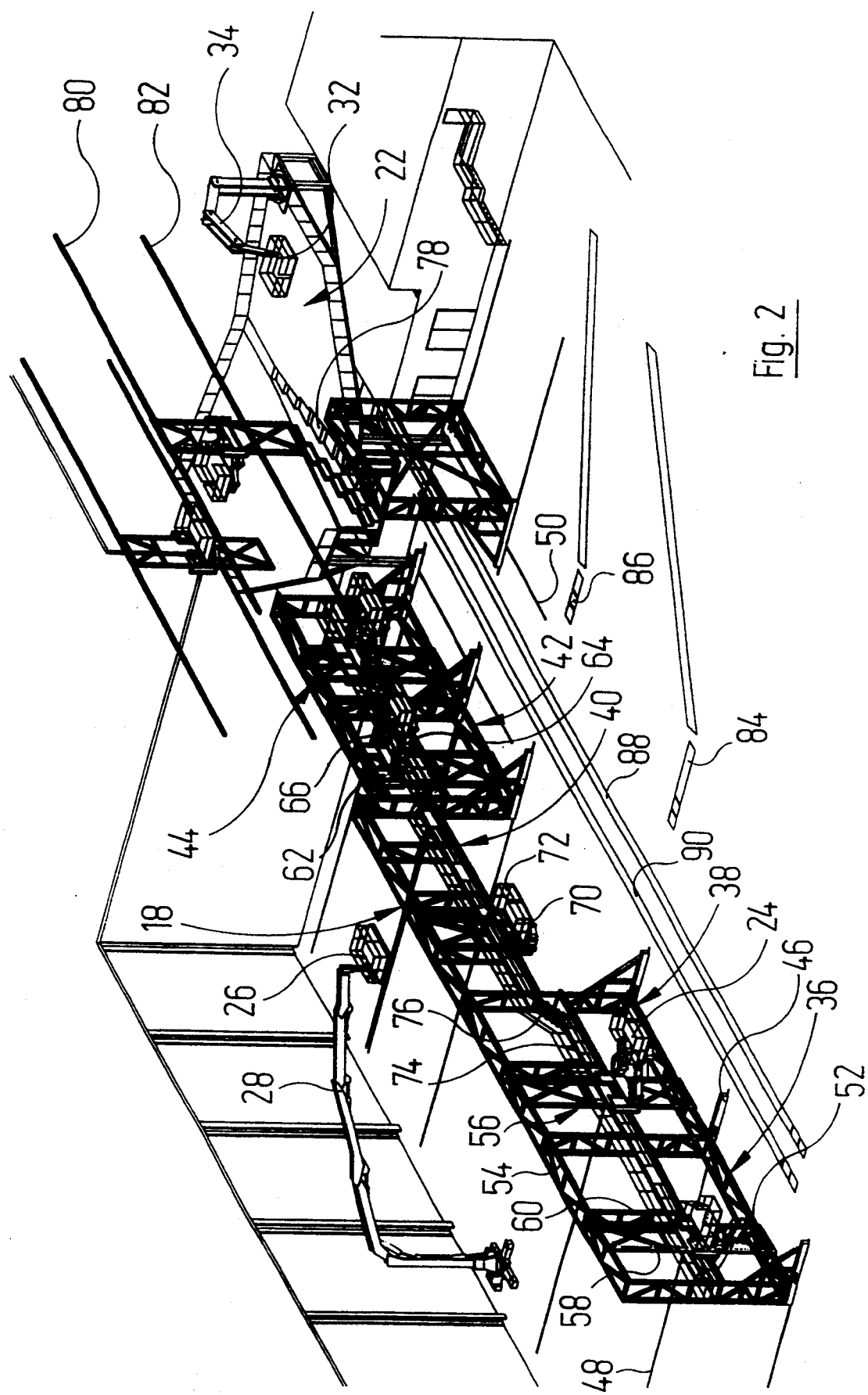
FIG. 2: a perspective view of the lefthand and rear dock parts of the dock according to FIG. 1.

As FIG. 2 reveals, the dock part 20 is a framework construction made of iron girders, with framework fields 36 to 44 which have transverse floor beams 46. Accommodated in the latter, but not evident in the drawing, are running wheels which run on transverse rails 48 and may be set in rotation by drive mechanisms which are likewise not shown.

In the embodiment shown in FIG. 2, the framework fields 36 to 42 are connected to form one unit, while the framework field 44 is movable independently. The lateral displacement path of the front dock unit formed by the framework fields 36 to 42 is long enough for the ends of the wings of the aircraft 16 to run unimpeded past the inside of the dock part 18. The path of movement of the rear framework field 44 is long enough to allow said framework field to move completely out of the path of the rear dock part 22, which in turn is movable on rails 50 extending in a longitudinal direction.

A bottom inner longitudinal beam 52 as well as a top inner longitudinal beam 54 of the various framework fields serve in each case as a horizontal guide rail for a vertical guide frame 56 with lateral vertical frame beams 58, 60. Running along the frame beams 58, 60 is, in each case, a support slide 62 on which a work platform 24 is mounted via two spaced-apart scissor-type linkages 64, 66.

Each of the work platforms 24 has a base 70 surrounded by a railing 72.

Drive mechanisms, which are not shown in FIG. 2, are provided for displacing the vertical guide frames 56 on the longitudinal beams 52, 54 in a longitudinal direction of the fuselage, the support slides 62 on the vertical guide frames 56 in a vertical direction and the two scissor-type linkages 64, 66 in a transverse direction of the fuselage. If the scissor-type linkages 64, 66 are extended or retracted by identical amounts, the work platform 24 moves, with its orientation (angular position relative to the vertical axis) unchanged, towards or away from the fuselage. If the scissor-type linkages 64, 66 are extended or retracted by differing amounts, this results in a rotation of the work platform 24 about the vertical axis and, at the same time, a lateral movement in a longitudinal direction of the fuselage. Thus, a work platform 24 may effectively be moved in a longitudinal direction beyond the end of the associated framework field.

Counterweights, which are not shown in the drawing, are provided on the vertical guide slides 56 and counterbalance the weight of the support slides 62, the scissor-type linkages 64, 66 and the work platform 68 as well as the average weight of a mechanic with an average amount of equipment. Thus, the drive mechanism does not have to expend a great deal of power for vertical displacement of the work platform and, as a result, it can also operate in a particularly jolt-free manner.

The drive mechanisms (not shown) for vertical displacement of the work platforms 24 and the drive mechanisms for adjusting the scissor-type linkages 64, 66 are preferably fitted with motors which are phase-controlled. This too is of benefit for smooth, jolt-free movement of the work platforms. Instead or additionally, crank mechanisms may be inserted into the power transmission link between the corresponding motors and their load in order to be able to effect an even smoother displacement in a vertical and horizontal direction out of a predetermined rest position. To allow adjustment of the corresponding zero point, clutches may be provided between said crank mechanisms and the relevant drive motor.

It goes without saying that, where adjacent framework fields of identical geometry are rigidly connected, the longitudinal beams 52 and 54 are continuous so that the corresponding vertical guide frames 56 may move over both framework fields provided that the position of the other vertical guide frame or frames 56 and of the work platform 24 carried thereby permits it.

Thus, two adjacent work platforms 24 may be moved together and connected by interlocking means (not shown) to form one large work platform.

As is evident from FIG. 2, in the framework field 40, the bottom longitudinal beam 52 extends at a greater distance from the floor of the maintenance hangar, thereby allowing the wing of the aircraft to extend through freely below the framework field 40.

Walkways 74 are recessed halfway up the framework fields 36, 38, 42, 44, with the difference in levels at the junction points with framework field 40, and with the hangar floor, being overcome by stairs 76.

As FIG. 2 likewise reveals, the rear dock part 22 in the middle has two-dimensional stairs 78 which are adapted to the contour of the end of the fuselage.

Vertical guide frames 56 for the tail region of the aircraft are movable along horizontal guide rails 80, 82 which are fastened to the roof structure of the maintenance hangar.

Markings 84, 86 on the floor of the maintenance hangar set the limits within which the leading edge and the trailing edge of a wing have to lie if the framework field 40 is to be able to move unimpeded over the wing. Further markings 88, 90 set the desired path for the nose wheels of the aircraft.

The procedure for docking an aircraft is as follows:

The dock parts 18, 20 are moved apart sideways; the rear dock part 22 is moved into its rearmost position. The aircraft is then pushed backwards into the maintenance hangar, with the nose wheels moving along the markings 88, 90. Once the leading edge of the wings has reached the marking 84, the aircraft is brought to a halt and jacked up at the permitted support points. Each set of framework fields 36 to 42 forming a single unit is then moved sideways towards the axis of the fuselage, with the work platforms 24 previously having been aligned with the most prominent point of the outer skin (in the fuselage region: horizontal centre plane of the fuselage). The framework fields 36 to 42 are then brought to a halt, leaving a preset gap of, in practice, about 10 cm for maintenance work and 30 cm for painting (wider passage facility for an air curtain of the kind described in detail below with reference to FIG. 8) between the work platforms and the outer surface of the aircraft.

The rear dock part 22 is then moved on the rails 50 towards the tail of the aircraft until the desired distance between the two-dimensional stairs 78 and the outer skin is obtained. If the aircraft has such a long fuselage that the rear dock part 22 is still outside of the path of the framework fields 44, the latter are then moved, in the manner described above for the framework fields 36 to 42, towards the fuselage of the aircraft.

All that then remains is for the various supply and disposal lines, which are laid in the framework fields 36 to 44, to be connected via central rapid-action couplings (not shown) to appropriate hangar-fixed connections and docking of the aircraft is complete. The total time required for docking is in practice only a few hours. The work which has to be carried out on the outer skin and the interior of the aircraft may then be carried out.

On completion of said work, undocking is effected simply by releasing the rapid-action couplings for the supply and disposal lines and moving the dock parts 18 to 22 completely away from the aircraft again.

Since the lateral dock parts 18, 20 always remain erected, it is possible to use them to store parts which are frequently needed so that they are readily accessible.

In a modification to the embodiment described above, the framework field 42 and the framework field 40 may alternatively be constructed as separately movable dock parts. The framework field 40 may then be moved sideways over the wing and work carried out there from the corresponding work platform 24. By adjusting the scissor-type linkages 64, 66 of said work platform to differing extents, the work platform may also travel under extremely wide edge regions of the wing, thereby allowing said regions to be maintained likewise from the dock. Given such a dock construction, it is then possible to provide a vertical guide frame and a work platform also on the, in FIG. 2, lefthand outer side of the framework field 40. By virtue of an extension of the scissor-type linkages 64, 66 for the inner-lying work platform 24, which is synchronous with the outward movement of the framework field 40, the outer-lying work platform may then move over the wing, with the position of the inner-lying work platform 24 remaining unchanged. With the outer-lying work platform it is possible, in particular, to obtain easy access also to upright wing tip sections (winglets).

Figure 7:
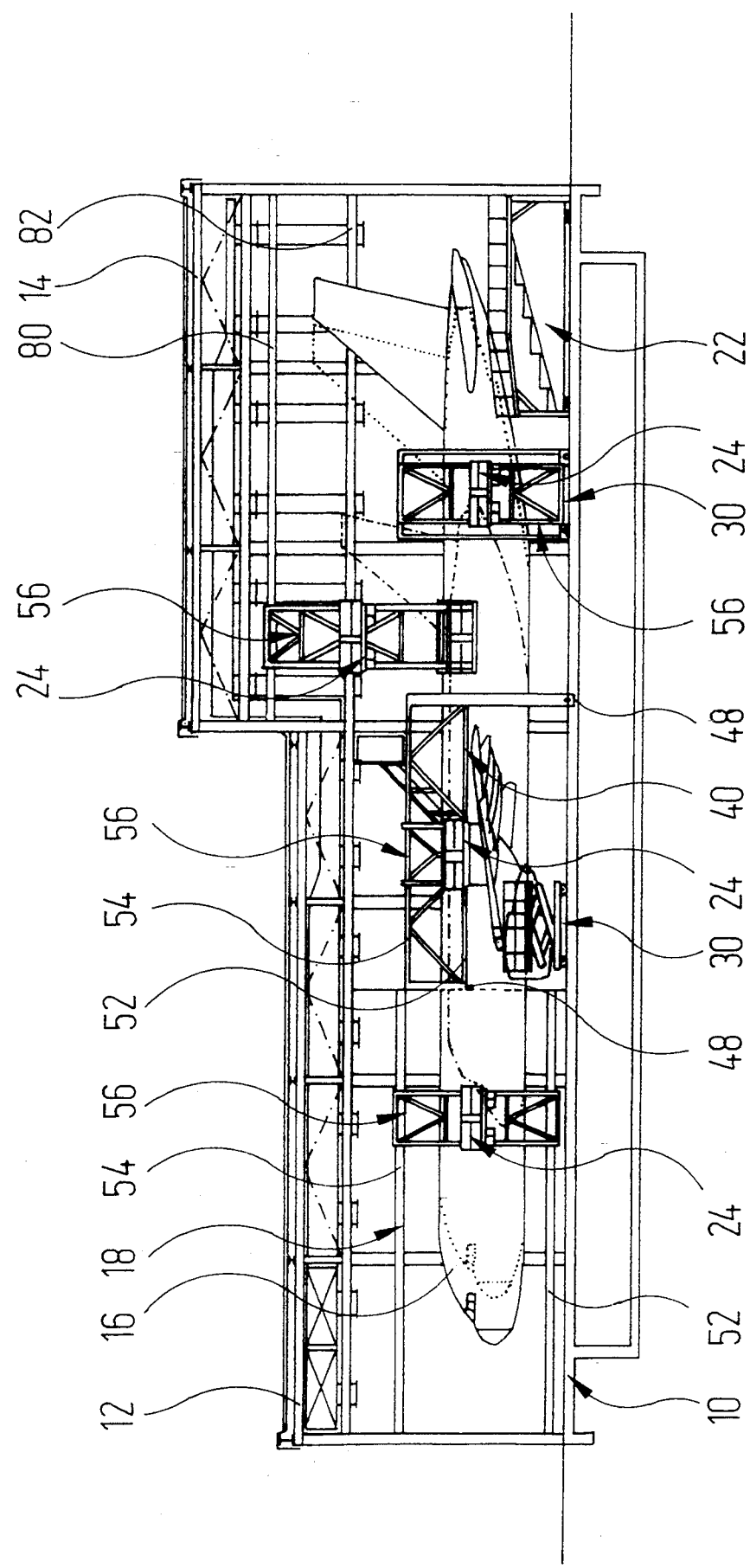
FIG. 7: a longitudinal section through another aircraft maintenance hangar with a modified work dock.

FIG. 7 shows a simplified work dock, into which the aircraft is moved nose first. Dock parts, which have already been described above in a functionally equivalent form with reference to FIGS. 1 to 6, are once more provided with the same reference numerals and do not need to be described in detail again below. Those sections of the dock parts 18, 20, from which work is carried out on the part of the fuselage situated in front of the wings, are rigidly connected to the building. The middle framework field 40 associated with the wing region is then movable sideways along the building-fixed rails 48; work is carried out on the rear part of the fuselage from work platforms 24 which are disposed on movable vertical guide frames 56. The arrangement of the suspended work platforms for the region of the rudder unit and the adjacent area of the fuselage is identical to that of FIGS. 1 to 6.

In the righthand part of FIG. 7, a mobile work platform 30 is shown which, on an undercarriage, e.g. a fork lift truck, has a vertical guide frame 56 of the type also used in the dock parts 18, 20. Said frame, via a support slide and two scissor-type linkages, carries a work platform which is therefore adjustable in precisely the same manner as the work platform carried by the dock parts. Although the movement in a longitudinal direction of the fuselage is effected here by the undercarriage, this is immaterial to the worker located on the work platform; he is able to control the work platform in the same way as a work platform carried by a dock part.

For undocking, in the embodiment according to FIG. 7, the rear dock part 22 is pulled out of the maintenance hangar and parked to one side on the apron. The middle framework field 40 of the dock part 18 associated with the wing area is positioned to one side against the hangar wall and the aircraft may then be pushed out of the hangar.

For docking, the aircraft is pulled along the dock axis into the hangar until the leading edge of the wing reaches the front end of the passage of the framework field 40, in accordance with a marking corresponding to the marking 84. The middle framework fields 40 are then moved, in the manner described above, towards the fuselage and the rear dock part 22 is moved towards the tail. In said manner, too, docking and undocking is quick and easy.

FIG. 8 is a diagrammatic view of an air ducting system which may be used for the maintenance hangars described above but which, for improved clarity, was not shown in FIGS. 1 to 7.

In FIG. 8, the two lateral dock parts 18, 20 are indicated merely diagrammatically by dashes. At their top end, they carry air distributing channels 92, 94, which project upwards and inwards and so do not impede the movement of the vertical guide frames and which are provided with downward-directed large-area outlet grids 96. The distributing channels are in contact when the lateral dock parts 18, 20 are in the position in which they are extended furthest inward.

The distributing channels 92, 94 are each connected to a fan 98, which is carried by the corresponding dock part 18, 20 and supplies large quantities of air under low pressure. Said air quantities are delivered as a wide slow curtain from the underside of the distributing channels 92, 94 and are intercepted by a collecting channel 100, which is closed by a grid 102 lying between the markings 88, 90. The collecting channel 100 is connected via diagrammatically indicated intake lines 104 to the suction sides of the fans 98 and via branch lines 106 of said lines to the suction sides of further fans 108.

The fans 108 generate a smaller air quantity than the fans 98 but said air quantity is under higher pressure. Said air is delivered in each case via a distributing pipe 110 into a plurality of angled lances 112, which together form a well-defined, thin air curtain which outwardly delimits the slow wide air stream generated by the distributing channels 92, 94.

In said manner it is on the whole ensured that the paint mist occurring during painting work is carried away from the painting location without generating stray flows and that parts of said relatively slow air curtain cannot pass from that work dock to an adjacent work dock.

In the case of the work dock shown in FIG. 8, there is no need to establish connection points for the air ducting system to a building-fixed device; feedback of the air from the collecting channel 100 to the fans 98, 108 may be effected in each case via an upwardly open bottom channel 114, which extends only over that sub-region of the displacement path of the lateral dock parts 18, 20 in which the working position of the dock parts has to be adjusted owing to the differing fuselage diameter of various types of aircraft. Said bottom channel is covered, in each case, by a connection plate 116 of the dock parts 18, 20 which carries a connecting sleeve connected to the intake line 104.

FIG. 8 shows the position of the dock parts for the type of aircraft which, of all the types of aircraft to be serviced, has the smallest fuselage diameter. For aircraft having a larger fuselage diameter, the inner-lying ends of the distributing channels 92, 94 lie a corresponding distance apart. A uniform air curtain is nevertheless obtained in the region of the predominantly lateral fuselage surfaces which are to be painted.

In a modification to the embodiment shown in FIG. 8, the lances 112 may alternatively be arranged in such a way that they generate the well-defined air curtain on the inside or even the outside of the dock parts 18, 20. At points of the dock parts 18, 20 which are cut off by obstacles (e.g. built-in shelves or the like) from the thin, well-defined air curtain generated by the lances 112, it is possible to provide additional lances locally in order to close the air curtain at said points.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A dock for carrying out work on an aircraft, comprising:
   a plurality of support frameworks comprising longitudinal beams, disposed on either side of the fuselage; and
   a plurality of support work platforms, wherein the support frameworks are movable sideways far enough away from an axis of the dock for the aircraft to be docked and undocked along the dock axis past the support frameworks, wherein the support frameworks, at least in a front framework field lying in front of a wing leading edge or in a rear framework field lying behind a wing trailing edge of the aircraft, are movable sideways by at least a wing length away from the dock axis, wherein bottom longitudinal beams of a middle framework field associated with a wing region of the aircraft extend at such a distance from a floor of a maintenance hangar housing the aircraft that a wing of the aircraft may freely extend through and under said middle framework field, and wherein the support frameworks have horizontal guide means for vertical guide frames, along which run vertically movable support slides, each of which carries one of the work platforms via a strut arrangement whose length is adjustable in a horizontal direction.

2. The dock according to claim 1, wherein:
the support frameworks in the middle framework field extending from the wing leading edge to at least the wing trailing edge are movable sideways.

3. The dock according to claim 2, wherein:
the support frameworks include a plurality of framework sections including middle framework sections which are respectively movable sideways independently of front or rear framework sections.

4. The dock according to claim 1, wherein:
the dock has a rear dock part, which is movable in a longitudinal direction of the dock, and
the support frameworks have at least one rear framework section which is movable sideways out of a path of the rear dock part.

5. The dock according to claim 4, wherein:
for a range of adjustment of the rear dock part there are provided vertical guide frames with support slides running along the same and which run along horizontal guide rails carried by a hangar roof structure, said support slides each carrying a work platform via a strut arrangement a length of which is adjustable in a horizontal direction.

6. The dock according to claim 3, wherein:
the middle framework section at its outside, via horizontal guide means and a vertical guide frame running thereon and a support slide running on said frame, carries a further work platform.

7. The dock according to claim 6, wherein:
the further work platform is mounted on the associated support slide via a length-adjustable strut arrangement.

8. The dock according to claim 6, wherein:
a control for a servo drive of an inner-lying strut arrangement is provided, which controls said an inner-lying strut arrangement in correspondence with the sideways movement of the middle framework section in such a way that the positions of the free ends of said strut arrangement which carry the work platform remain unchanged.

9. The dock according to claim 1, wherein:
the strut arrangements are formed by scissor-type linkages.

10. The dock according to claim 9, wherein:
each strut arrangement comprises two spaced-apart scissor-type linkages, which are adjustable in length independently of one another.

11. The dock according to claim 9, wherein:
free ends of telescoped scissor-type linkages are connected to an underside of the work platform at such a point that the telescoped scissor-type linkages just fits under the work platform.

12. The dock according to claim 9 or 10, wherein:
the free ends of the scissor-type linkages are connected to the side of the associated work platform facing the support framework in such a way that the underside of the scissor-type linkages and an underside of the work platform are flush.

13. The dock according to claim 1, wherein:
means are provided for interlocking two work platforms after they have been moved together.

14. The dock according to claim 1, wherein:
the vertical guide frames are standard vertical guide frames for fork lift trucks.

15. The dock according to claim 14, wherein:
at least one of the standard vertical guide frames is mounted on an undercarriage and forms a mobile work platform.

16. The dock according to claim 2, wherein:
laterally movable distributing channels are provided which generate a low-speed air curtain running vertically through an interior of the dock and are preferably carried by the movable dock parts.

17. The dock according to claim 17, wherein:
lance arrangements are provided, which are movable sideways and generate a high-speed air curtain directed downwards towards the interior of the dock, the lance arrangements being preferably carried by the dock parts.

18. The dock as claimed in claim 17, wherein:
laterally movable dock parts carry fans which act upon the distributing channels and the lance arrangements respectively.

* * * * *